(12) United States Patent
Petricek

(10) Patent No.: US 8,018,212 B1
(45) Date of Patent: Sep. 13, 2011

(54) BUCK-BOOST REGULATOR

(75) Inventor: Shea Lynn Petricek, University Park, TX (US)

(73) Assignee: Intersil Americas Inc., Milpitas, CA (US)

( * ) Notice: Subject to any disclaimer, the term of this patent is extended or adjusted under 35 U.S.C. 154(b) by 621 days.

(21) Appl. No.: 12/134,800

(22) Filed: Jun. 6, 2008

Related U.S. Application Data

(60) Provisional application No. 60/957,838, filed on Aug. 24, 2007.

(51) Int. Cl.
*G05F 1/24* (2006.01)

(52) U.S. Cl. ........................................... 323/259

(58) Field of Classification Search ................ 323/247, 323/259, 265, 273, 282, 328, 344
See application file for complete search history.

(56) References Cited

U.S. PATENT DOCUMENTS

| | | | |
|---|---|---|---|
| 4,413,224 A | 11/1983 | Krupka et al. | |
| 4,521,726 A | 6/1985 | Budnik | |
| 4,658,204 A | 4/1987 | Goodwin | |
| 4,801,859 A * | 1/1989 | Dishner | ........................ 323/224 |
| 5,399,958 A | 3/1995 | Iyoda | |
| 5,514,947 A | 5/1996 | Berg | |
| 5,705,919 A | 1/1998 | Wilcox | |
| 5,731,694 A | 3/1998 | Wilcox et al. | |
| 5,747,977 A | 5/1998 | Hwang | |
| 5,760,495 A | 6/1998 | Mekanik | |
| 5,770,940 A | 6/1998 | Goder | |
| 5,959,853 A | 9/1999 | Kos | |
| 6,064,187 A | 5/2000 | Redl et al. | |
| 6,147,478 A | 11/2000 | Skelton et al. | |
| 6,147,526 A | 11/2000 | Skelton et al. | |
| 6,166,527 A * | 12/2000 | Dwelley et al. | ................ 323/222 |
| 6,246,222 B1 | 6/2001 | Nilles et al. | |
| 6,271,650 B1 | 8/2001 | Massie et al. | |

(Continued)

FOREIGN PATENT DOCUMENTS

DE     3343883 A1     6/1984

(Continued)

OTHER PUBLICATIONS

Hara, N. et al. "Realization and Analysis of a New Switched-Capacitor Coilless Powersupply for One-Chip IC Implementation." Systems & Computers in Japan, Wiley, Hoboken, NJ, US. vol. 29, No. 12. Nov. 15, 1998 pp. 19-33. XP000821933.

*Primary Examiner* — Adolf Berhane
(74) *Attorney, Agent, or Firm* — Gary R. Stanford

(57) ABSTRACT

A buck-boost regulator for converting an input voltage to an output voltage which includes an inductor, an error circuit providing an error voltage, buck and boost switching circuits, buck and boost ripple circuits, and buck and boost hysteretic comparator circuits. The buck switching circuit switches a first end of the inductor, the buck ripple circuit replicates ripple current through the inductor based on the buck pulse signal and provides a buck ripple voltage, and the buck hysteretic comparator circuit develops the buck pulse signal based on a buck window voltage range using the error voltage. The boost switching circuit switches a second end of the inductor, the boost ripple circuit replicates ripple current through the inductor based on the boost pulse signal and provides a boost ripple voltage, and the boost hysteretic comparator circuit develops the boost pulse signal based on a boost window voltage range using the error voltage.

21 Claims, 6 Drawing Sheets

U.S. PATENT DOCUMENTS

| | | | |
|---|---|---|---|
| 6,307,360 B1 | 10/2001 | Kajiwara et al. | |
| 6,362,607 B1 | 3/2002 | Wickersham et al. | |
| 6,433,525 B2 | 8/2002 | Muratov et al. | |
| 6,456,050 B1 | 9/2002 | Agiman | |
| 6,495,995 B2 | 12/2002 | Groom et al. | |
| 6,583,610 B2 | 6/2003 | Groom et al. | |
| 6,791,306 B2 | 9/2004 | Walters et al. | |
| 6,819,577 B1 | 11/2004 | Wiktor et al. | |
| 6,825,644 B2 | 11/2004 | Kernahan et al. | |
| 6,841,983 B2 | 1/2005 | Thomas | |
| 6,922,044 B2 | 7/2005 | Walters et al. | |
| 7,019,502 B2 | 3/2006 | Walters et al. | |
| 7,106,036 B1 | 9/2006 | Collins | |
| 7,116,568 B1 * | 10/2006 | Birchenough | 363/132 |
| 7,132,820 B2 | 11/2006 | Walters et al. | |
| 7,193,396 B2 * | 3/2007 | Orr | 323/225 |
| 7,391,190 B1 * | 6/2008 | Rajagopalan | 323/271 |
| 7,394,231 B2 * | 7/2008 | Flatness et al. | 323/259 |
| 7,432,689 B2 * | 10/2008 | Miller et al. | 323/259 |
| 7,495,419 B1 * | 2/2009 | Ju | 323/259 |
| 7,570,033 B1 * | 8/2009 | Ju | 323/259 |
| 7,598,715 B1 | 10/2009 | Hariman et al. | |
| 7,696,735 B2 | 4/2010 | Oraw et al. | |
| 7,737,668 B2 * | 6/2010 | Oswald et al. | 323/259 |
| 7,786,712 B2 | 8/2010 | Williams | |
| 7,834,608 B2 * | 11/2010 | Cheng et al. | 323/299 |
| 7,932,709 B1 * | 4/2011 | Ling | 323/285 |
| 2001/0035745 A1 | 11/2001 | Muratov et al. | |
| 2003/0142519 A1 | 7/2003 | Walters et al. | |
| 2004/0090804 A1 | 5/2004 | Lipcsei et al. | |
| 2004/0196095 A1 | 10/2004 | Nonaka | |
| 2009/0033289 A1 | 2/2009 | Xing et al. | |
| 2009/0033293 A1 | 2/2009 | Xing et al. | |
| 2009/0102440 A1 * | 4/2009 | Coles | 323/271 |

FOREIGN PATENT DOCUMENTS

| | | |
|---|---|---|
| DE | 4206478 A1 | 9/1993 |
| EP | 0650250 A1 | 4/1995 |
| EP | 0883051 A1 | 12/1998 |
| EP | 1073187 A2 | 1/2001 |
| FR | 2610149 A1 | 7/1998 |
| WO | WO03065558 | 8/2003 |

* cited by examiner

BUCK-BOOST REGULATOR

CROSS-REFERENCE TO RELATED APPLICATIONS

This application claims the benefit of U.S. Provisional Application Ser. No. 60/957,838, filed on Aug. 24, 2007, which is herein incorporated by reference for all intents and purposes. This application is also related to application entitled "BOOST REGULATOR USING SYNTHETIC RIPPLE REGULATION" filed concurrently herewith at least one common inventor and which is commonly assigned, which is herein incorporated by reference for all intents and purposes.

DESCRIPTION OF THE RELATED ART

Many electronic devices require voltage rails that fall both above and below the input voltage range of the device. The very common 5 Volt (V) and/or 3.3V rails in systems often have this situation when required to run from battery source and an alternating current (AC) adaptor source. A boost converter can boost voltage of a lower input voltage but is generally not applicable when the input voltage is higher than the output voltage. A buck converter reduces a higher input voltage to a lower output voltage but is generally not applicable when the input voltage is lower than the desired output voltage. Various approaches have been used to address this situation including 2-stage architectures in which stage 1 boosts the input voltage to some point above the required output and stage 2 then steps the boosted rail back down to the desired voltage. Another approach is the common single ended primary inductor converter (SEPIC) converter. Both of these solutions incur efficiency or component count and/or component size penalties.

Another approach is a basic H-bridge formation with a single inductor to generate a buck-boost capability in one step. Controlling the H-Bridge switches in this arrangement, however, is difficult when attempting to achieve both high efficiency and low output ripple, especially in the region of operation in which the output voltage and the input voltage values are very close.

SUMMARY OF THE PRESENT INVENTION

A buck-boost regulator for converting an input voltage to an output voltage according to one embodiment includes an inductor having a first end and a second end, an error circuit which determines an error of the output voltage and which provides an error voltage indicative thereof, a buck switching circuit, a buck ripple circuit, a buck hysteretic comparator circuit, a boost switching circuit, a boost ripple circuit, and a boost hysteretic comparator circuit.

The buck switching circuit switches the first end of the inductor between the input voltage and ground as controlled by a buck pulse width modulation signal. The buck ripple circuit replicates ripple current through the inductor based on the buck pulse width modulation signal and provides a buck ripple voltage indicative thereof. The buck hysteretic comparator circuit develops the buck pulse width modulation signal based on comparing the buck ripple voltage within a buck window voltage range between the error voltage and the error voltage combined with a buck window voltage.

The boost switching circuit switches the second end of the inductor between the output voltage and ground as controlled by a boost pulse width modulation signal. The boost ripple circuit replicates ripple current through the inductor based on the boost pulse width modulation signal and provides a boost ripple voltage indicative thereof. The boost hysteretic comparator circuit develops the boost pulse width modulation signal based on comparing the boost ripple voltage within a boost window voltage range between the error voltage and the error voltage combined with a boost window voltage.

In one embodiment, the buck and boost window voltages are adjusted based on the input voltage. In a more specific embodiment, the window voltages are adjusted based a difference between the input and output voltages.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes a system and method of controlling the buck and boost regulator switches in an H-bridge configuration using synthetic ripple regulation, although alternative configurations are possible. The system and method includes operation in both discontinuous conduction mode (DCM) and continuous conduction mode (CCM) states. In the illustrated embodiment, two relatively independent synthetic ripple modulators are employed. A first controls buck operation and the other controls boost operation. Each operates as a standalone circuit. Due to the natural operation of synthetic ripple modulators, it is illustrated herein that benefits of current mode control are preserved (critical to the CCM mode boost operation) and behavior in the region where VOUT and VIN values are close is relatively easy to control. Further, the asynchronous character of synthetic ripple concepts allows the implementation of DCM operational modes with relatively simple circuits.

Figure 1:
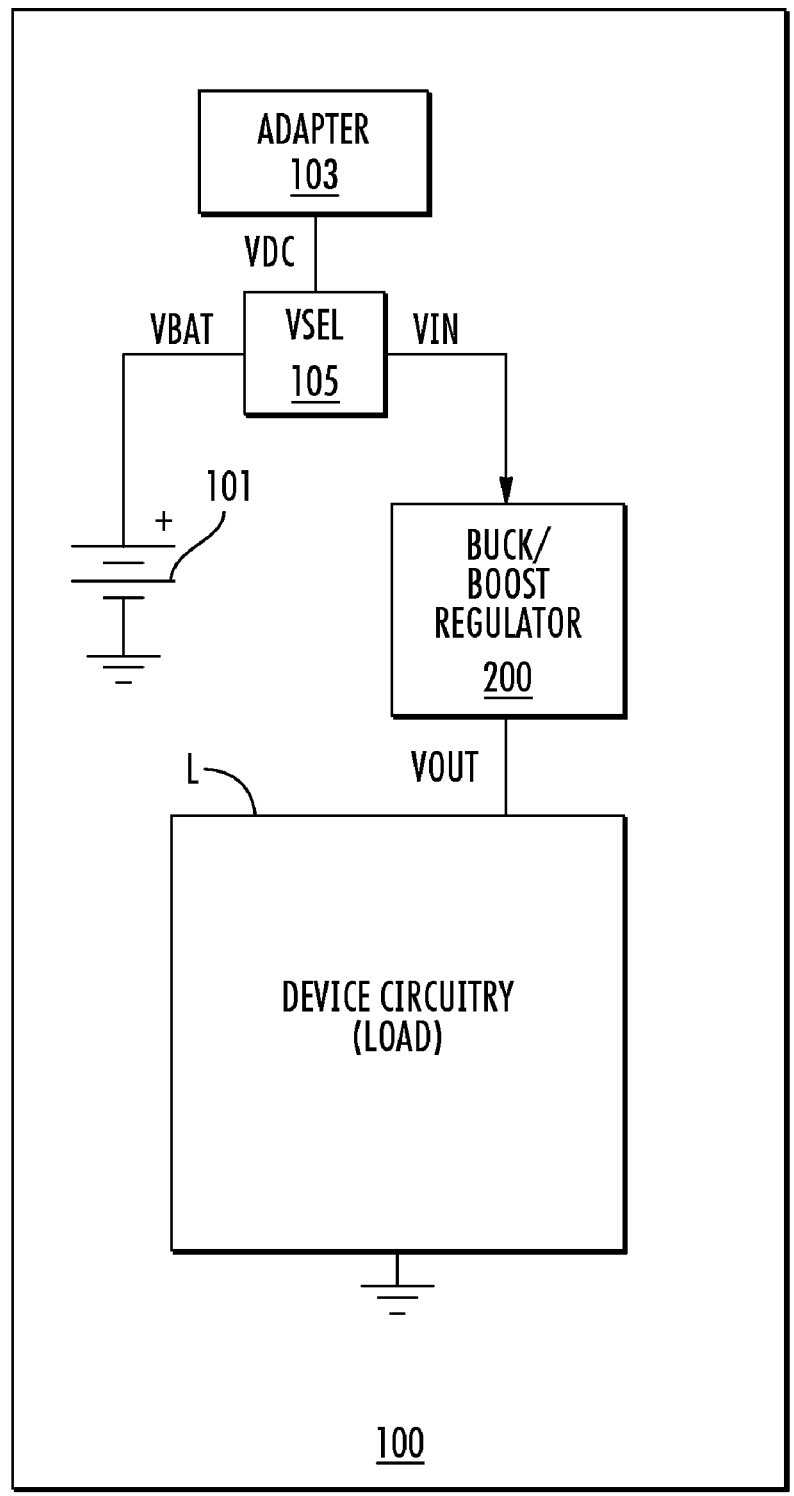
FIG. 1 is a block diagram of a battery-powered electronic device including a buck-boost regulator implemented according to an exemplary embodiment.

FIG. 1 is a block diagram of a battery-powered electronic device 100 including a buck-boost regulator 200 implemented according to an exemplary embodiment. The electronic device 100 includes a battery 101 providing a battery voltage VBAT to one input of a voltage select (VSEL) circuit 105, having another input receiving a DC voltage (VDC) from an adapter 103. The adapter 103 receives power from an external power source, such as an alternating current (AC) source (not shown), and converts to the VDC voltage. If the battery 101 is rechargeable, then the adapter 103 may include a battery charger for charging the battery 101 or a separate battery charger (not shown) may be included. The VSEL circuit 105 provides an input voltage VIN to an input of the buck-boost regulator 200. The buck-boost regulator 200 has an output providing an output voltage VOUT, which is used to provide source voltage to a load L, which generally includes the circuitry of the electronic device 100.

The primary functions of the electronic device 100 are performed by the load L which is the device circuitry in the illustrated configuration. In one embodiment the battery 101 is a rechargeable battery of any suitable type, such as a lithium-ion (Li-ion) battery, nickel-metal hydride (NiMH) battery, a nickel-cadmium (NiCd) battery, etc., used for providing power to an electronic device as understood by those of ordinary skill in the art. When the external power source is not available, the battery 101 provides the power to the device in which the VSEL circuit 105 generally operates to transfer the VBAT voltage as VIN to the buck-boost regulator 200. In an alternative embodiment, the battery 101 may be a non-rechargeable battery, such as any type of dry cell-type, alkaline, carbon-zinc, etc., battery commonly used in portable electronic devices. In any case the voltage of VIN varies within a range from below to above the desired regulated level of VOUT.

The electronic device 100 represents any type of battery-powered electronic device, including mobile, portable, or handheld devices, such as, for example, any type of personal digital assistant (PDA), personal computer (PC), portable computer, laptop computer, etc., cellular phone, personal media device, etc. The voltage VBAT of the battery 101 may vary within a certain voltage range which depends upon the type of battery and/or the number of battery cells. A Li-ion battery, for example, typically has a voltage range of 3V to 4.2V per cell. It is desired, however, that the voltage VOUT used to provide power to the load L maintain a relatively stable and regulated voltage level. For example, if it is desired that VOUT be maintained at approximately 3.3V with a Li-ion type battery 101 which ranges from 3 to 4.2V, then the buck-boost regulator 200 boosts a lower VIN level and reduces a higher VIN level to maintain VOUT at 3.3V.

Figure 2:
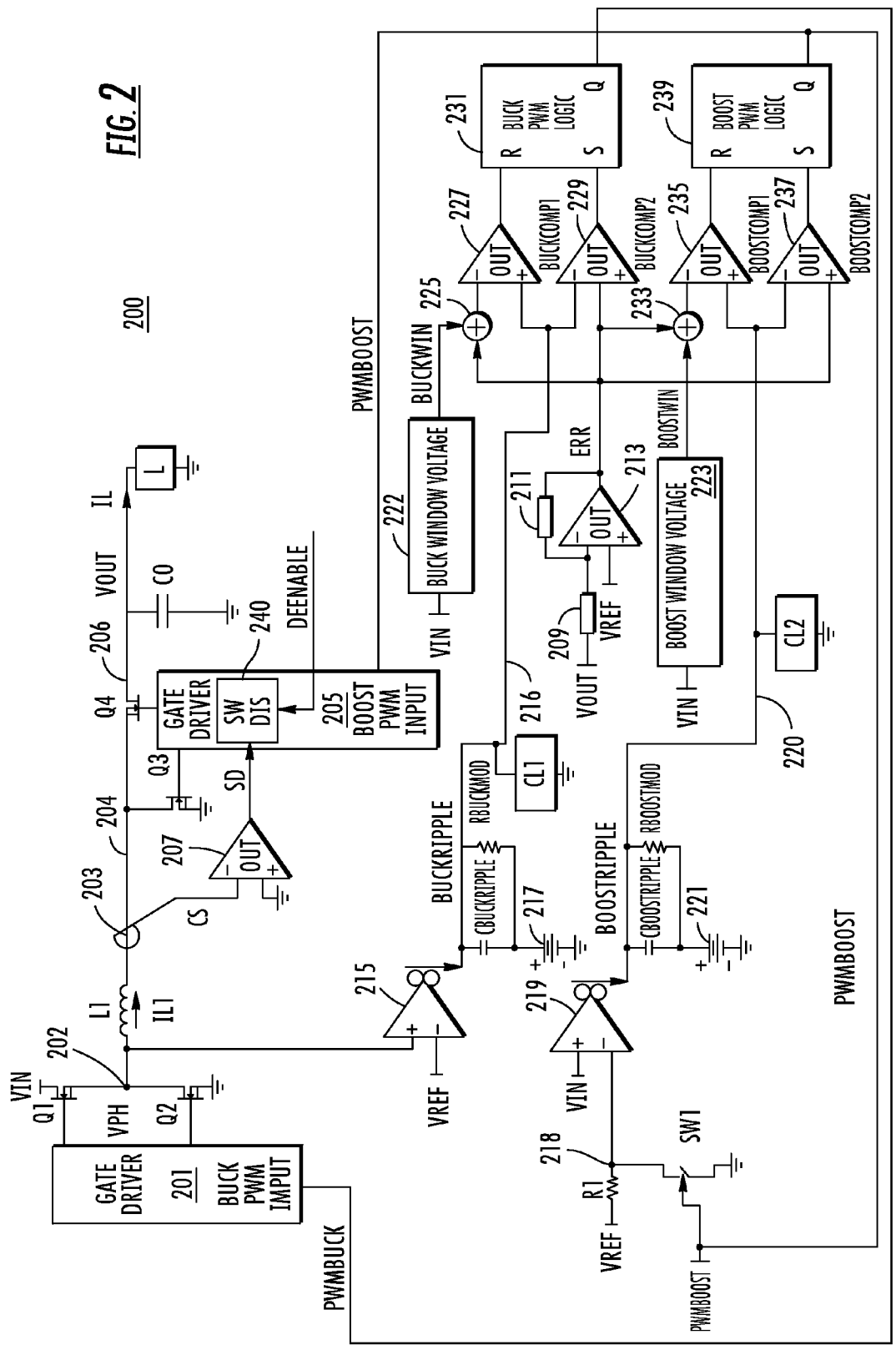
FIG. 2 is a schematic diagram of the buck-boost regulator of FIG. 1 implemented according to an exemplary embodiment combining both buck and boost regulation in an H-bridge configuration.

FIG. 2 is a schematic diagram of the buck-boost regulator 200 implemented according to an exemplary embodiment combining both buck and boost regulation in an H-bridge configuration. A buck gate driver 201 receives a PWMBUCK signal and drives the gates of electronic switches Q1 and Q2 based on buck regulation operation. In the illustrated embodiment, electronic switches Q1-Q4 are shown as N-channel devices, such as N-channel field-effect transistors (FETs) or metal-oxide semiconductor FETs (MOSFETs) or the like. Alternative devices may be used, such as P-channel devices and/or different types of transistors and the like. The drain of Q1 is coupled to the input voltage VIN and its source is coupled to a node 202 developing a phase voltage VPH. The drain of Q2 is coupled to node 202 and its source is coupled to ground. Node 202 is coupled to one end of inductor L1, having its other end coupled to a node 204 through a current sensor 203. Various methods may be used to sense inductor current, such as a resistor, an inductor, DCR methods using the DC series resistance of the inductor L1, etc. A boost gate driver 205 receives a signal PWMBOOST and drives the gates of electronic switches Q3 and Q4 based on boost regulation operation. The drain of Q3 is coupled to node 204 and its source is coupled to ground. The drain of Q4 is coupled to node 204 and its source is coupled to output node 206 developing the output voltage VOUT. An output filter capacitor CO is coupled between node 206 and ground. The load L is coupled between output node 206 and ground and receives a load current IL. The current sensor 203 senses inductor current IL1 and develops a corresponding current sense voltage CS, which is provided to an inverting input of a comparator 207. The non-inverting input of the comparator 207 is coupled to ground and its output provides a switch disable signal SD. The boost gate driver 205 further includes a switch disable circuit (SW DIS) receiving the switch disable signal SD and a diode emulation enable signal DEENABLE. Electronic switches Q1-Q4 are shown as N-channel MOSFETs although other types of electronic switches may be used.

VOUT is provided to one end of a compensation circuit 209, having its other end coupled to the inverting input of an error amplifier 213 and to one end of a compensation circuit 211. The other end of the compensation circuit 211 is coupled to the output of the error amplifier 213 which develops an error signal ERR. The non-inverting input of the error amplifier 213 receives a reference voltage VREF. The compensation circuits 209 and 211 are collectively implemented in any suitable manner to provide loop compensation as understood by those skilled in the art, such as comprising a suitable resistor-capacitor (RC) circuit or the like. The phase node 202 is provided to the non-inverting input of a transconductance amplifier 215, having its inverting input receiving VREF. A ripple capacitor CBUCKRIPPLE and a resistor RBUCKMOD are coupled in parallel between node 216 and a positive terminal of an offset voltage source 217, having its negative terminal coupled to ground. The transconductance amplifier 215 outputs a ripple current to charge the ripple capacitor CBUCKRIPPLE so that node 216 develops a ripple voltage BUCKRIPPLE. VREF is provided to one end of a resistor R1 having its other end coupled to a node 218, which is coupled to the inverting input of another transconductance amplifier 219. VIN is provided to the non-inverting input of the transconductance amplifier 219, which has an output coupled to a node 220 developing a ripple voltage BOOSTRIPPLE. The PWMBOOST signal is provided to the control input of a single-pole, single-throw (SPST) switch SW1, which has its switched terminals coupled between node 218 and ground. A ripple capacitor CBOOSTRIPPLE and a resistor RBOOSTMOD are coupled in parallel between node 220 and a positive terminal of an offset voltage source 221. The negative terminal of the voltage source 221 is coupled to ground.

A buck window voltage circuit 222 has an input receiving input voltage VIN and an output providing a buck window voltage BUCKWIN. A boost window voltage circuit 223 has an input receiving input voltage VIN and an output providing a boost window voltage BOOSTWIN. BUCKWIN is provided to one input of an adder 225 receiving the ERR voltage at its other input and having an output coupled to the inverting input of a comparator 227. BUCKRIPPLE is provided to the non-inverting input of the comparator 227 and to the inverting input of another comparator 229, which receives the ERR voltage at its non-inverting input. The output of the comparator 227 is coupled to a reset R input of buck PWM logic 231 and the output of the comparator 229 is coupled to a set input of the PWM logic 231. The PWM logic 231 has an output providing the PWMBUCK signal. BOOSTWIN is provided to one input of an adder 233 which receives the ERR voltage at its other input, and which has an output coupled to the inverting input of a comparator 235. BOOSTRIPPLE is provided to the non-inverting input of the comparator 235 and to the inverting input of another comparator 237, which receives the ERR voltage at its non-inverting input. The output of the comparator 235 is coupled to a reset input of boost PWM logic 239 and the output of the comparator 237 is coupled to a set input of the PWM logic 239. The PWM logic 239 has an output providing the PWMBOOST signal. A voltage clamp circuit CL1 is coupled between node 216 and ground to prevent BUCKRIPPLE from falling below a predetermined minimum level and another voltage clamp circuit CL2 is coupled between node 220 and ground to prevent BOOSTRIPPLE from rising above a predetermined maximum level.

In operation, the transconductance amplifier 215 generates current at its output proportional to the voltage difference VPH-VREF. VPH switches between VIN and ground based on operation of Q1 and Q2. When PWMBUCK is asserted high, the buck gate driver 201 turns Q1 on and turns Q2 off so that VIN is effectively coupled to node 202 driving VPH to the voltage of VIN. In normal buck converter operation, VIN is greater than VREF so that the BUCKRIPPLE voltage ramps up while PWMBUCK is high. When BUCKRIPPLE increases to the sum of the voltages BUCKWIN and ERR, then the comparator 227 asserts its output to reset the buck PWM logic 231, which pulls PWMBUCK back low. In response, the buck gate driver 201 turns Q1 off and Q2 on to pull VPH to ground. Thus, BUCKRIPPLE begins ramping down back to the voltage level of ERR. When BUCKRIPPLE drops to the voltage level of ERR, the comparator 229 switches and sets the buck PWM logic 231, which re-asserts the PWMBUCK signal back high. Operation repeats in this manner for each PWM cycle. The transconductance amplifier 215 creates switched current to CBUCKRIPPLE proportional to the inductor current IL1 from the perspective of the buck converter. In the ideal case, L1/RS=RBUCKMOD*CBUCKRIPPLE, in which L1 is the inductance, RS is the combined series resistance of the sensed path (e.g., including the internal resistance of the inductor L1 and switch resistance), RBUCKMOD is the resistance of ripple resistor RBUCKMOD, and CBUCKRIPPLE is the capacitance of the ripple capacitor CBUCKRIPPLE.

The ripple voltage BUCKRIPPLE effectively replicates the ripple current through the inductor L1 for the buck converter. In general, the transconductance amplifier 215 synthetically replicates ripple current through the inductor L1 based on voltage applied across the inductor L1 from the perspective of the buck converter. VPH is the voltage applied to one end and VREF is the nominal or target voltage level of VOUT generally applied to the other end of the inductor L1. In an alternative embodiment, a separate switch (not shown) may be used to switch the non-inverting input of the transconductance amplifier 215 between VIN and ground based on the PWMBUCK signal. The voltage difference between VPH (or switched VIN) and VREF is converted by the transconductance amplifier 215 to a replicated ripple current, which is then provided to charge the ripple capacitor CBUCKRIPPLE forming the ripple voltage which replicates ripple current through the inductor L1. A voltage waveform may be readily generated by noting that the current through a voltage-driven inductor is equivalent to the voltage across a current-driven capacitor. In this manner, driving a ripple capacitor with a current proportional to the voltage across the inductor L1 provides the desired waveform shape for controlling the buck converter. It is noted that this relationship does not have to be strictly enforced for operation of the converter.

Operational frequency of the buck modulator portion varies with VIN and VOUT. If VIN decreases towards VOUT, frequency tends to decrease and reaches a relatively low frequency level when VIN and VOUT are very close together. The buck window voltage circuit 222 adjusts the hysteresis window voltage of the buck comparators 227 and 229 with changes of the voltage level of VIN. In one embodiment, BUCKWIN decreases as VIN decreases until VIN reaches the nominal voltage level of VOUT (e.g., VREF), in which case BUCKWIN remains at a predetermined minimum voltage level if VIN continues to decrease below VOUT. In this manner, by reducing the hysteresis window, frequency is maintained at a suitable level so that ripple voltage is reasonably well controlled. In one alternative embodiment, the buck window voltage circuit 222 may further adjust BUCKWIN to adjust the hysteresis voltage based on changes of VOUT, which would be particularly advantageous if VOUT is variable rather than being targeted to a fixed voltage level. In another embodiment, the gain of the transconductance amplifier 215 is adjusted with changes of VIN (and VOUT in another embodiment) instead of or in addition to adjustment of the buck converter hysteresis window.

Furthermore, as VIN decreases the pulse width of PWMBUCK increases up to a maximum as VIN falls below VOUT. In this condition Q1 stays on longer during each cycle effectively coupling one end of the inductor L1 to VIN, which is very similar to the circuit configuration of a boost converter (e.g., VIN being coupled directly to one end of L1). If VIN falls below VREF, the transconductance amplifier 215 may continuously pull current from the CBUCKRIPPLE capacitor so that it may charge to a very high negative voltage level representative of the reverse current that would otherwise flow if the same inductor terminal voltages were presented as DC voltages. Allowing the capacitor CBUCKRIPPLE to charge to a voltage level significantly below the actual window voltage may not be desirable for good large signal performance. If allowed, the ERR signal may be forced to slew further requiring time and allowing VOUT to drift further from its setpoint. The clamp circuit CL1 prevents BUCKRIPPLE from dropping below a minimum voltage level and thus keeps its voltage near the active region when VIN and VOUT are near each other, particularly when VIN falls below VOUT.

When PWMBOOST is asserted high, the boost gate driver 205 turns Q3 on and turns Q4 off to effectively pull node 204 to ground. When PWMBOOST is asserted high, switch SW1 is closed grounding node 218 so that the transconductance amplifier 219 outputs a current proportional to VIN to charge the capacitor CBOOSTRIPPLE. The BOOSTRIPPLE voltage ramps up and when it increases to the sum of the voltages BOOSTWIN and ERR, then the comparator 235 asserts its output to reset the boost PWM logic 239, which pulls PWMBOOST back low in response. When PWMBOOST is asserted low, the boost gate driver 205 turns Q3 off and turns Q4 on to couple node 204 to the output node 206. Also, the switch SW1 is opened so that node 218 is asserted to VREF and the transconductance amplifier 219 outputs a current proportional to VIN-VREF. In normal boost converter operation, VIN is less than VOUT (and thus less than VREF, which is the target level of VOUT) so that the transconductance amplifier 219 pulls current from capacitor CBOOSTRIPPLE and the BOOSTRIPPLE voltage begins ramping down back to the voltage level of ERR. When BOOSTRIPPLE drops back to ERR, the comparator 237 switches and sets the boost PWM logic 239, which re-asserts the PWMBOOST signal back high. Operation repeats in this manner for each PWM cycle. The transconductance amplifier 218 creates switched current to CBOOSTRIPPLE proportional to the inductor current IL1 from the perspective of the boost converter. In the ideal case, L1/RS=RBOOSTMOD*CBOOSTRIPPLE, in which RBOOSTMOD is the resistance of ripple resistor RBOOSTMOD and CBOOSTRIPPLE is the capacitance of the ripple capacitor CBOOSTRIPPLE.

The ripple voltage BOOSTRIPPLE effectively replicates the ripple current through the inductor L1 for the boost converter. In general, the transconductance amplifier 219 synthetically replicates ripple current through the inductor L1 based on voltage applied across the inductor L1 from the perspective of the boost converter. VIN generally applied (ignoring buck switching) to one end and switched VREF is applied to the other end of the inductor L1. As noted above, VREF is the nominal or target voltage level of VOUT. From the boost perspective, the electronic switches Q3 and Q4 switch one end of the inductor L1 between VOUT and ground, and this switching action is replicated by the switch SW1 switching node 218 between VREF and ground. In an alternative embodiment, the node 218 is coupled directly to node 204. The voltage difference between VIN and switched VREF (or node 204) at the input of the transconductance amplifier 219 is converted to a replicated ripple current, which is then provided to charge the ripple capacitor CBOOSTRIPPLE forming the ripple voltage which replicates ripple current through the inductor L1. In this manner, driving a ripple capacitor with a current proportional to the voltage across the inductor L1 provides the desired waveform shape for controlling the boost converter. It is noted that this relationship does not have to be strictly enforced for operation of the converter.

Operational frequency of the boost converter varies with VIN and VOUT. If VIN increases towards VOUT, frequency tends to decrease and reaches a relatively low frequency when VIN is close to VOUT. The boost window voltage circuit 223 adjusts the hysteresis window voltage of the boost comparators 235 and 237 with changes of the voltage level of VIN. In one embodiment, BOOSTWIN decreases as VIN increases until VIN reaches the nominal voltage level of VOUT, in which case BOOSTWIN remains at a predetermined minimum voltage level if VIN continues to increase. In this manner, by reducing the hysteresis window, frequency is maintained at a suitable level so that ripple voltage is reasonably well controlled. In one alternative embodiment, the boost window voltage circuit 223 may further adjust BOOSTWIN to adjust the hysteresis voltage based on changes of VOUT, which would be particularly advantageous if VOUT is variable rather than being at a fixed voltage. In another embodiment, the gain of the transconductance amplifier 219 is adjusted with changes of VIN (and VOUT in another embodiment) instead of or in addition to adjustment of the boost converter hysteresis window.

Furthermore, as VIN increases the pulse width of PWM-BOOST decreases down to a minimum level as VIN rises above VOUT. In this condition Q4 stays on longer during each cycle effectively coupling node 204 to the output node 206, which is very similar to the circuit configuration of a buck converter. If VIN rises above VREF, the transconductance amplifier 219 increases current to the CBOOSTRIPPLE capacitor so that it may charge to a very high positive voltage. Allowing the capacitor CBOOSTRIPPLE to charge to a voltage level significantly above the actual boost window voltage may not be desirable for good large signal performance. If allowed, the ERR signal may be forced to slew further requiring time and allowing VOUT to drift further from its setpoint. The clamp circuit CL2 prevents BOOSTRIPPLE from rising above a maximum voltage level and thus keeps its voltage near the active region when VIN and VOUT are near each other, particularly when VIN rises significantly above VOUT.

The SD signal at the output of the comparator 207 is ignored by switch disable circuit 240 of the boost gate driver 205 when the DEENABLE signal is negated low. If DEENABLE is negated low, then diode emulation is turned off and circuit operation is not affected. If, however, DEENABLE is asserted high, then when the CS signal from the current sensor 203 indicates a minimum current level (e.g., zero current) through the inductor L1 and/or when current through the inductor L1 begins to reverse, the comparator 207 asserts the SD signal. When the DEENABLE and SD signals are both asserted high, then the switch disable circuit 240 causes the boost gate driver 205 to keep Q4 turned off according to diode emulation operation to prevent inductor current from going below the minimum current level (e.g., from going negative). In one embodiment, the clamp circuits CL1 and CL2 may further be configured to clamp the ripple voltages BUCKRIPPLE and BOOSTRIPPLE during diode emulation mode. The diode emulation mode improves light load efficiency.

Figure 3:
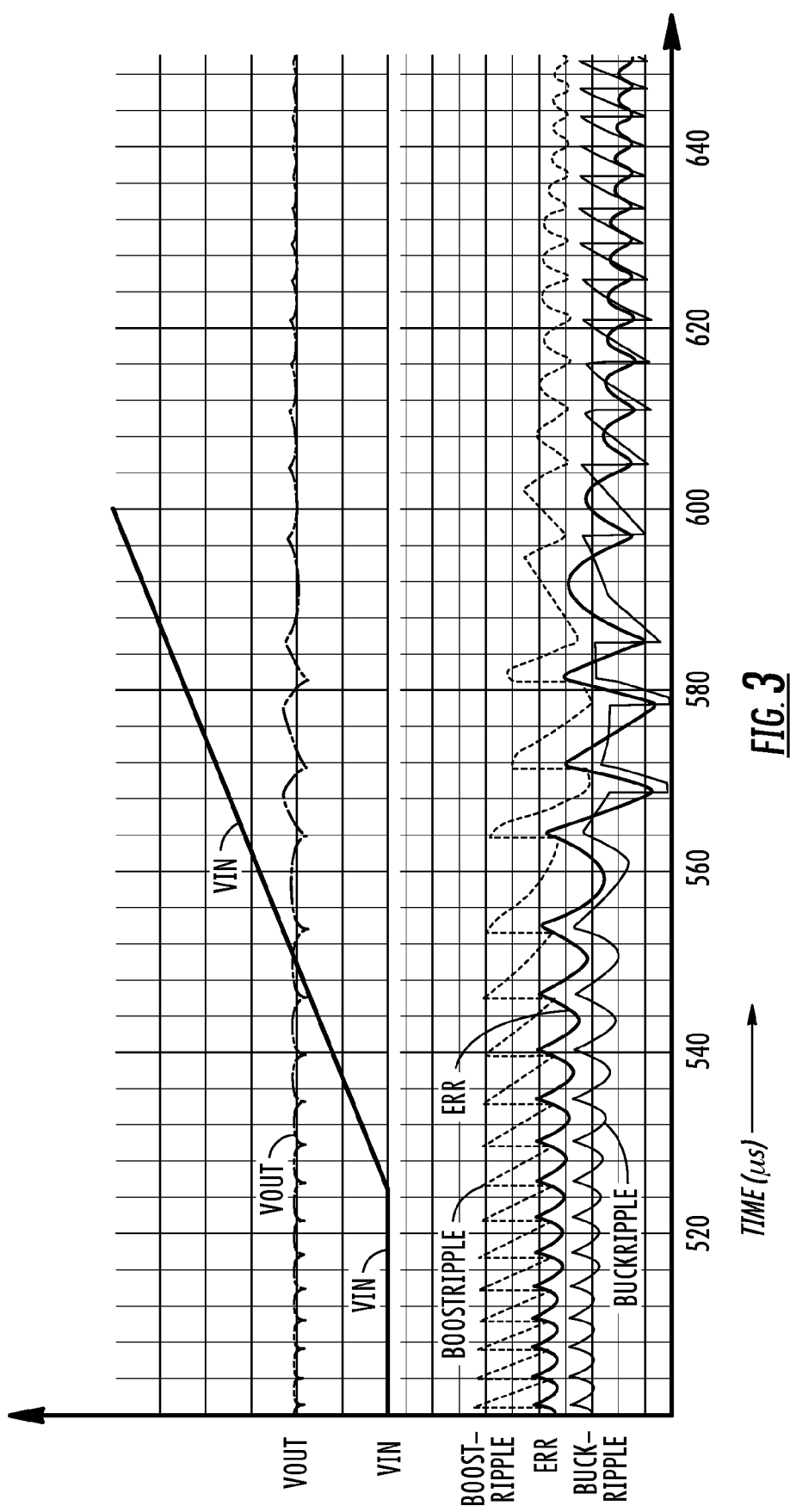
FIG. 3 is a graphic diagram illustrating operation of the buck-boost regulator of FIG. 2 for steady state output load current during a boost to buck transition.

FIG. 3 is a graphic diagram illustrating operation of the buck-boost regulator 200 for steady state output load current during a boost to buck transition. The voltages VOUT, VIN, BOOSTRIPPLE, ERR and BUCKRIPPLE are plotted versus time in microseconds (µs). VIN is below VOUT and begins ramping up after time 520. VIN reaches VOUT at about time 550 and continues to rise at a steady rate above VOUT after time 550. As the difference between VOUT and VIN nears zero, error ripple increases forcing both buck and boost switches to operate. VOUT ripple is still well-controlled while VIN rises from below VOUT to above VOUT. The voltage clamps CL1 and CL2 prevent BUCKRIPPLE from falling too far below the voltage of ERR during boost operation and BOOSTRIPPLE from rising too far above the voltage of ERR during buck operation.

Figure 4:
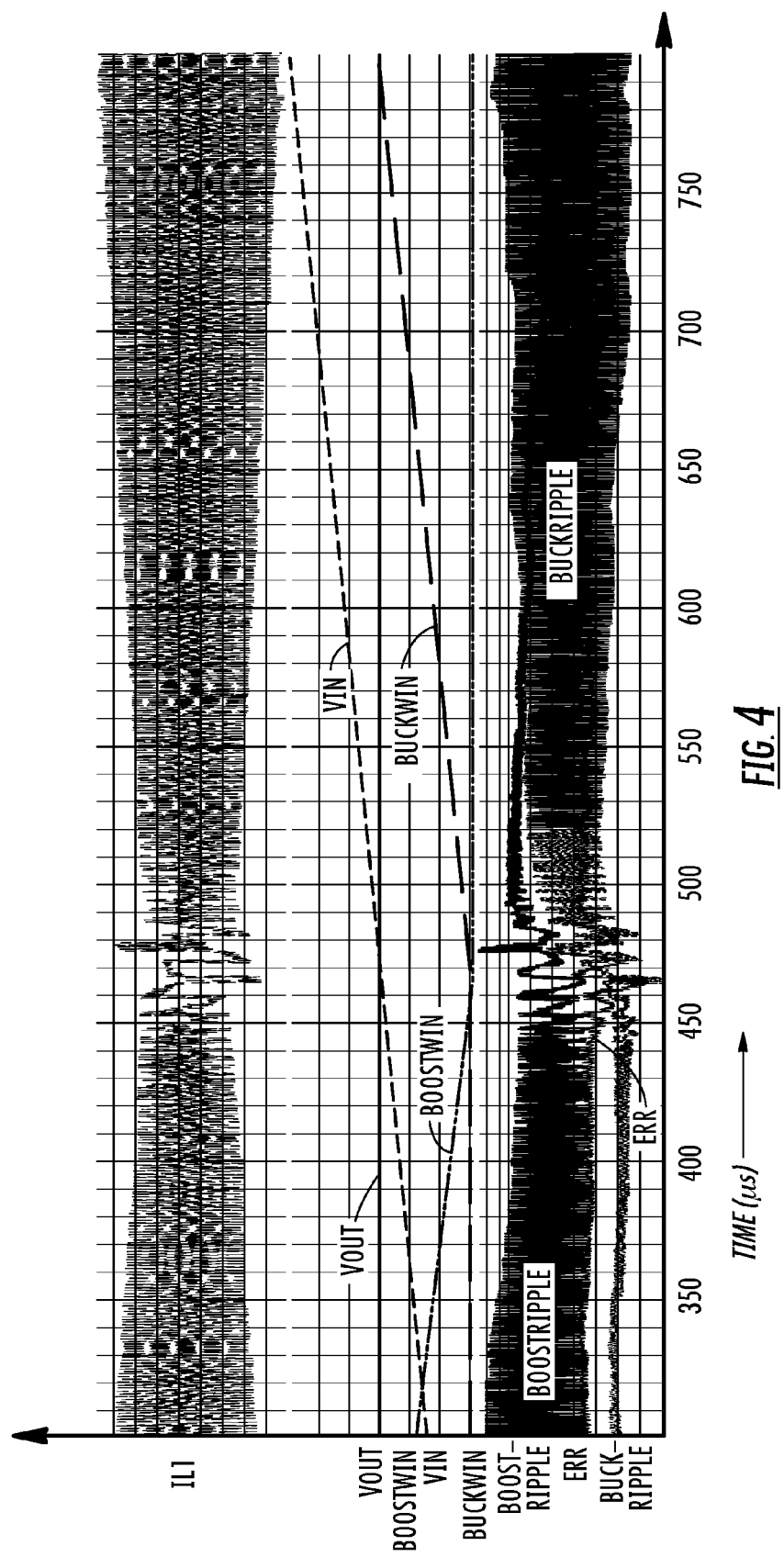
FIG. 4 is a graphic diagram illustrating frequency stabilization of the buck-boost regulator of FIG. 2.

FIG. 4 is a graphic diagram illustrating frequency stabilization of the buck-boost regulator 200. The inductor current IL1 and the voltages VOUT, BOOSTWIN, VIN, BUCKWIN, BOOSTRIPPLE, ERR and BUCKRIPPLE are plotted versus time in microseconds. VOUT is shown at a constant level whereas VIN ramps up from a lower voltage below VOUT to a higher voltage above VOUT. As previously described, BOOSTWIN decreases with increasing level of VIN until VIN=VOUT, and then BOOSTWIN remains at a minimum level while VIN rises above VOUT. BUCKWIN decreases with decreasing level of VIN until VIN=VOUT, and then BUCKWIN remains at a minimum level while VIN falls below VOUT. In this manner, BUCKWIN and BOOSTWIN both adjust with VIN to allow a lower hysteresis window as VIN nears VOUT from either direction. This is equivalent to decreasing converter ripple current and increasing frequency. This counteracts the natural tendency towards lower frequency as VIN nears VOUT. However, the circuit still operates at a relatively low frequency when VOUT is near VIN as shown by the BOOSTRIPPLE and BUCKRIPPLE signals between times 450 and 500.

Figure 5:
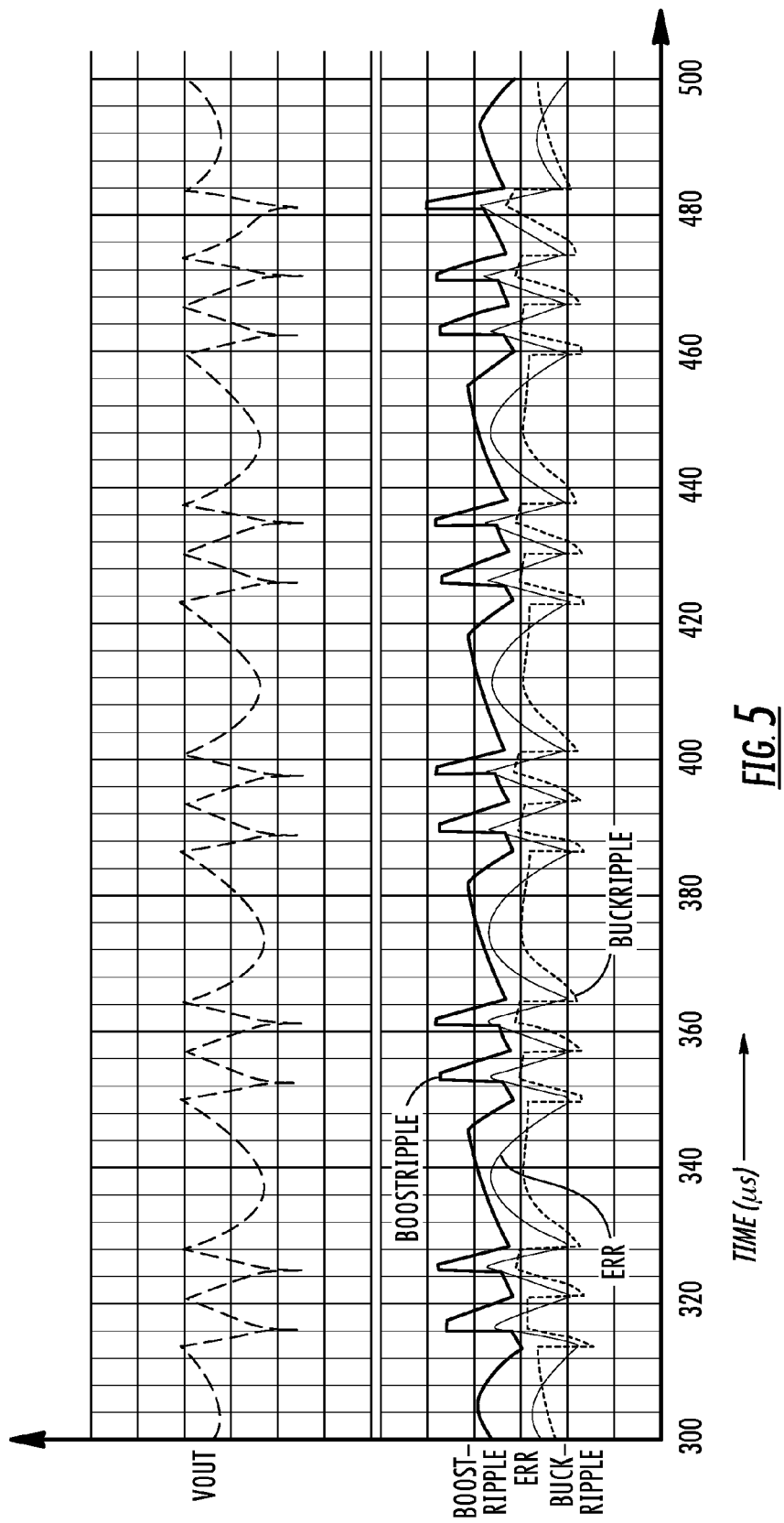
FIG. 5 is a graphic diagram illustrating steady-state operation of the buck-boost regulator of FIG. 2 when the input and output voltages are near each other.

FIG. 5 is a graphic diagram illustrating steady-state operation of the buck-boost regulator 200 when VIN is near VOUT. The voltages VOUT, BOOSTRIPPLE, ERR, and BUCKRIPPLE are plotted versus time in microseconds. The error amplifier 213 enables both buck and boost switches to operate. VOUT ripple is low even though effective frequency is relatively low (e.g., 135 KiloHertz) and output current is high (e.g., 1 A). This enables relatively high efficiency operation.

Figure 6:
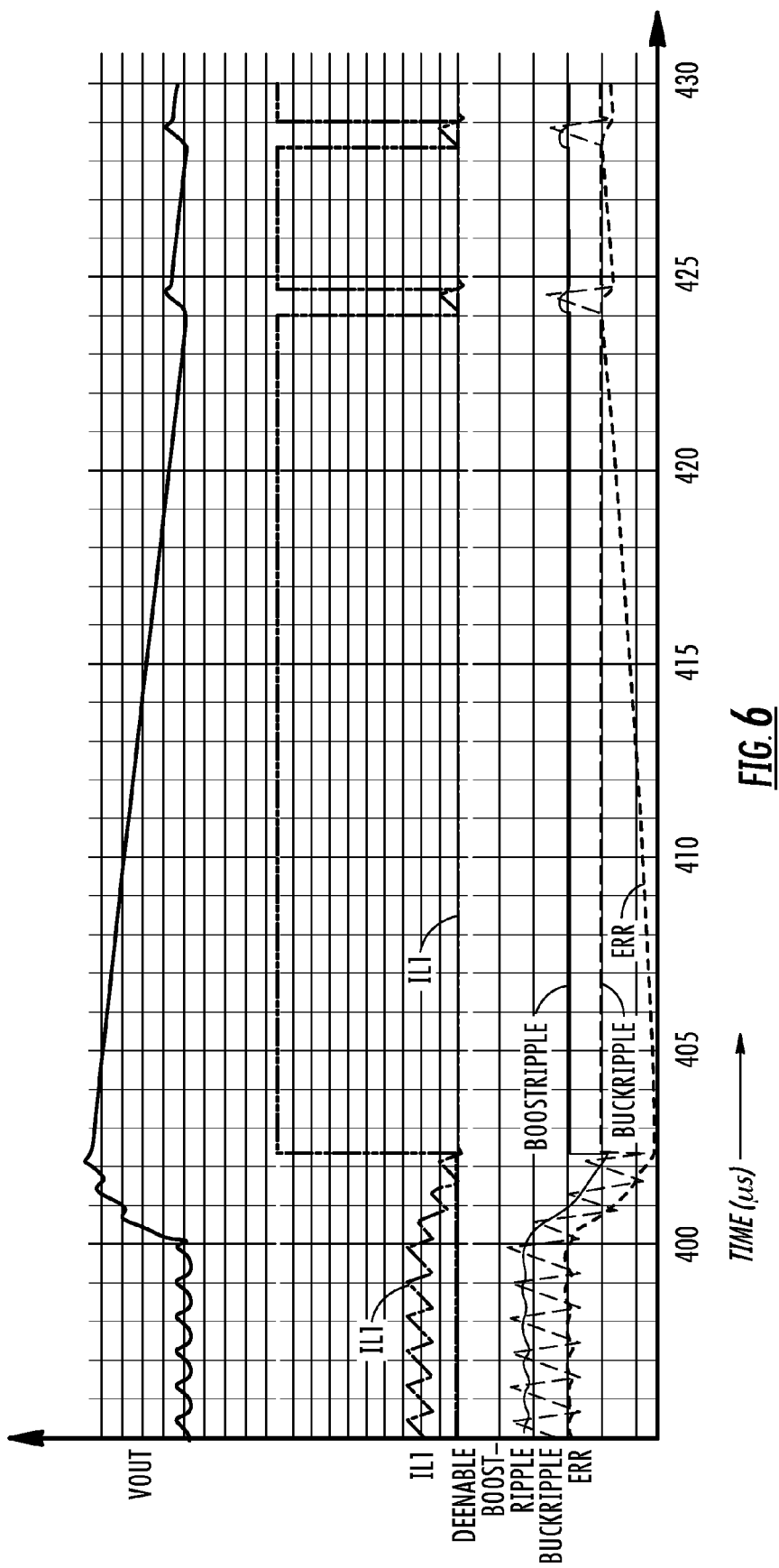
FIG. 6 is a graphic diagram illustrating operation of the buck-boost regulator of FIG. 2 during a diode emulation mode.

FIG. 6 is a graphic diagram illustrating operation of the buck-boost regulator 200 during a diode emulation (DE) mode. The voltages VOUT, BOOSTRIPPLE, BUCKRIPPLE and ERR are plotted along with the inductor current IL1 and the DEENABLE signal. The DEENABLE signal is asserted at about 402.5 microseconds. At 424 μs, the ERR signal commands a buck "ON" pulse.

The buck-boost regulator 200 provides the desired buck and boost function for the battery-powered electronic device 100. The buck-boost regulator 200 maintains the voltage of VOUT at a desired regulated voltage level while the voltage of VIN varies within a voltage range above and below the regulated voltage level of VOUT. The boost modulator portion is dominant when VIN is below VOUT and the buck modulator portion is dominant when VIN is above VOUT. Both modulators maintain switching operation when VIN and VOUT are relatively close together while maintaining relatively high efficiency operation with relatively low output ripple. Diode emulation may be selectively enabled or disabled depending upon the particular device and/or implementation. Diode emulation mode enables higher efficiency under light load conditions.

Although the present invention has been described in considerable detail with reference to certain preferred versions thereof, other versions and variations are possible and contemplated. For example, diode emulation performed by the switch disable circuit 240 may be implemented in alternative ways to maintain the inductor current at the minimum level during the diode emulation mode. In an alternative embodiment, a similar switch disable circuit (not shown) within the gate driver 201 may be used to disable switch Q2 during similar conditions. Also, the non-inverting inputs of the transconductance amplifiers 215 and 219 are shown coupled directly to VPH and VIN, respectively, whereas these inputs may alternatively be coupled to corresponding voltages indicative of VPH or VIN, such as using voltage divider circuits or other sense circuitry and the like. If corresponding voltage levels are used other than actual voltage levels, then the gains of the transconductance amplifiers 215 and 219 may be adjusted accordingly. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A buck-boost regulator for converting an input voltage to an output voltage, comprising:
   an inductor having a first end and a second end;
   an error circuit which determines an error of the output voltage and which provides an error voltage indicative thereof;
   a buck switching circuit which switches said first end of said inductor between the input voltage and ground as controlled by a buck pulse width modulation signal;
   a buck ripple circuit which replicates ripple current through said inductor based on said buck pulse width modulation signal and which provides a buck ripple voltage indicative thereof;
   a buck hysteretic comparator circuit which develops said buck pulse width modulation signal based on comparing said buck ripple voltage within a buck window voltage range between said error voltage and said error voltage combined with a buck window voltage;
   a boost switching circuit which switches said second end of said inductor between the output voltage and ground as controlled by a boost pulse width modulation signal;
   a boost ripple circuit which replicates ripple current through said inductor based on said boost pulse width modulation signal and which provides a boost ripple voltage indicative thereof; and
   a boost hysteretic comparator circuit which develops said boost pulse width modulation signal based on comparing said boost ripple voltage within a boost window voltage range between said error voltage and said error voltage combined with a boost window voltage.

2. The buck-boost regulator of claim 1, wherein said buck ripple circuit comprises:
   a ripple capacitive circuit which develops said buck ripple voltage on a first node;
   a second node providing a reference voltage indicative of the output voltage; and
   a transconductance amplifier having a first input receiving a voltage indicative of the voltage of said first end of said inductor, a second input coupled to said second node, and an output coupled to said first node for providing a buck ripple current to said ripple capacitive circuit.

3. The buck-boost regulator of claim 2, wherein said ripple capacitive circuit comprises:
   a ripple capacitor coupled between said first node and a third node;
   a ripple resistor coupled between said first node and said third node; and
   an offset voltage source coupled between ground and said third node.

4. The buck-boost regulator of claim 1, further comprising a clamp circuit coupled to said buck ripple voltage which prevents said buck ripple voltage from falling below a predetermined minimum voltage level.

5. The buck-boost regulator of claim 1, wherein said buck hysteretic comparator circuit comprises:
   a combiner which combines said error voltage with said buck window voltage and which provides a hysteresis voltage indicative thereof;
   a first comparator which compares said buck ripple voltage with said hysteresis voltage and which provides a reset signal indicative thereof;
   a second comparator which compares said buck ripple voltage with said error voltage and which provides a set signal indicative thereof; and
   a logic circuit which receives said set and reset signals and which toggles said buck pulse width modulation signal based on said set and reset signals.

6. The buck-boost regulator of claim 5, wherein said buck window circuit asserts said buck window voltage at a minimum voltage while the input voltage is below the output voltage and adjusts said buck window voltage proportional to the input voltage while the input voltage is at or above the output voltage.

7. The buck-boost regulator of claim 1, wherein said boost ripple circuit comprises:
   a ripple capacitive circuit which develops said boost ripple voltage on a first node;
   a second node which switches between a reference voltage indicative of the output voltage and ground based on said boost pulse width modulation signal; and
   a transconductance amplifier having a first input receiving a voltage indicative of the input voltage, a second input coupled to said second node, and an output coupled to said first node for providing a boost ripple current to said ripple capacitive circuit.

8. The buck-boost regulator of claim 7, wherein said ripple capacitive circuit comprises:
   a ripple capacitor coupled between said first node and a third node;
   a ripple resistor coupled between said first node and said third node; and an offset voltage source coupled between ground and said third node.

9. The buck-boost regulator of claim 1, further comprising a clamp circuit coupled to said boost ripple voltage which prevents said boost ripple voltage from rising above a predetermined maximum voltage level.

10. The buck-boost regulator of claim 1, wherein said boost hysteretic comparator circuit comprises:
a combiner which combines said error voltage with said boost window voltage and which provides a hysteresis voltage indicative thereof;
a first comparator which compares said boost ripple voltage with said hysteresis voltage and which provides a reset signal indicative thereof;
a second comparator which compares said boost ripple voltage with said error voltage and which provides a set signal indicative thereof; and
a logic circuit which receives said set and reset signals and which toggles said boost pulse width modulation signal based on said set and reset signals.

11. The buck-boost regulator of claim 10, wherein said boost window circuit asserts said boost window voltage at a minimum voltage while the input voltage is above the output voltage and adjusts said boost window voltage inversely proportional to the input voltage while the input voltage is at or below the output voltage.

12. The buck-boost regulator of claim 1, further comprising:
a current sense circuit coupled to said inductor which asserts said switch disable signal when said inductor current reaches a minimum level; and
a switch disable circuit which disables a switch of at least one of said buck and boost switching circuits while said switch disable signal is asserted during a diode emulation mode.

13. An electronic device, comprising:
a power source providing an input voltage which ranges between a minimum voltage and a maximum voltage;
a load which receives a regulated source voltage having a voltage level which is greater than said minimum voltage and less than said maximum voltage; and
a buck-boost regulator for converting said input voltage to said regulated source voltage, comprising:
an inductor having a first end and a second end;
an error circuit which determines an error of said regulated source voltage and which provides an error voltage indicative thereof;
a buck switching circuit which switches said first end of said inductor between said input voltage and ground as controlled by a buck pulse width modulation signal;
a buck ripple circuit which replicates ripple current through said inductor based on said buck pulse width modulation signal and which provides a buck ripple voltage indicative thereof;
a buck hysteretic comparator circuit which develops said buck pulse width modulation signal based on comparing said buck ripple voltage with said error voltage;
a boost switching circuit which switches said second end of said inductor between said regulated source voltage and ground as controlled by a boost pulse width modulation signal;
a boost ripple circuit which replicates ripple current through said inductor based on said boost pulse width modulation signal and which provides a boost ripple voltage indicative thereof; and
a boost hysteretic comparator circuit which develops said boost pulse width modulation signal based on comparing said boost ripple voltage with said error voltage.

14. The electronic device of claim 13, wherein:
said buck ripple circuit comprises:
a buck ripple capacitive circuit coupled to a first node which develops said buck ripple voltage on said first node;
a second node providing a reference voltage indicative of said regulated source voltage; and
a buck transconductance amplifier having a first input receiving a voltage indicative of the voltage of said first end of said inductor, a second input coupled to said second node, and an output coupled to said first node for providing a buck ripple current to said buck ripple capacitive circuit; and
wherein said boost ripple circuit comprises:
a boost ripple capacitive circuit coupled to a third node which develops said boost ripple voltage on said third node;
a fourth node which switches between said reference voltage and ground based on said boost pulse width modulation signal; and
a boost transconductance amplifier having a first input receiving a voltage indicative of said input voltage, a second input coupled to said fourth node, and an output coupled to said third node for providing a boost ripple current to said boost ripple capacitive circuit.

15. The electronic device of claim 14, further comprising a first clamp circuit coupled to said first node which prevents said buck ripple voltage from falling below a predetermined minimum voltage level, and a second clamp circuit coupled to said fourth node which prevents said boost ripple voltage from rising above a predetermined maximum voltage level.

16. The electronic device of claim 13, further comprising:
a buck window circuit which adjusts a buck window voltage based on said input voltage relative to said regulated source voltage;
a boost window circuit which adjusts a boost window voltage based on said input voltage relative to said regulated source voltage;
wherein said buck hysteretic comparator circuit adds said buck window voltage to said error voltage for determining a buck hysteretic window for comparing said buck ripple voltage; and
wherein said boost hysteretic comparator circuit adds said boost window voltage to said error voltage for determining a boost hysteretic window for comparing said boost ripple voltage.

17. The electronic device of claim 13, wherein said power source comprises a battery.

18. A method of controlling a buck-boost regulator which converts an input voltage to an output voltage, comprising:
switching a first end of an inductor between the input voltage and ground as controlled by a buck pulse width modulation signal;
switching a second end of the inductor between the output voltage and ground as controlled by a boost pulse width modulation signal;
determining an error of the output voltage and providing an error voltage indicative thereof;
replicating ripple current through the inductor based on the buck pulse width modulation signal and providing a buck ripple voltage indicative thereof;

replicating ripple current through the inductor based on the boost pulse width modulation signal and providing a boost ripple voltage indicative thereof;

comparing the buck ripple voltage within a buck window voltage range and providing the buck pulse width modulation signal indicative thereof, wherein the buck window voltage range comprises a first voltage range between the error voltage and the error voltage combined with a buck window voltage; and comparing the boost ripple voltage within a boost window voltage range and providing the boost pulse width modulation signal indicative thereof, wherein the boost window voltage range comprises a second voltage range between the error voltage and the error voltage combined with a boost window voltage.

19. The method of claim 18, wherein:

said replicating ripple current through the inductor based on the buck pulse width modulation signal and providing a buck ripple voltage indicative thereof comprises:

comparing a voltage indicative of the voltage at the first end of the inductor with a reference voltage indicative of the output voltage and converting to a buck ripple current indicative thereof; and charging a buck ripple capacitor with the buck ripple current;

switching a first node between the reference voltage and ground based on the boost pulse width modulation signal; and wherein said replicating ripple current through the inductor based on the boost pulse width modulation signal and providing a boost ripple voltage indicative thereof comprises:

comparing a voltage indicative of the input voltage with the voltage of the first node and converting to a boost ripple current indicative thereof; and charging a boost ripple capacitor with the boost ripple current.

20. The method of claim 18, further comprising:

adjusting the buck window voltage based on a voltage difference between the input voltage and the output voltage; and adjusting the boost window voltage based on the voltage difference.

21. The method of claim 18, further comprising:

detecting the current through the inductor falling to a minimum current level; and disabling at least one of said switching a first end of the inductor and switching a second end of the inductor while the current through the inductor remains at the minimum current level during a diode emulation mode.

* * * * *